No. 893,293. PATENTED JULY 14, 1908.
J. A. WRIGHT & A. M. NICODEMUS.
DENTAL MIRROR.
APPLICATION FILED OCT. 7, 1907.
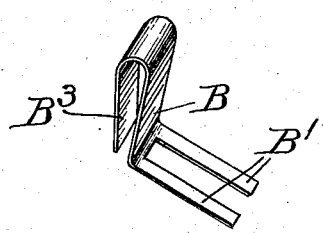
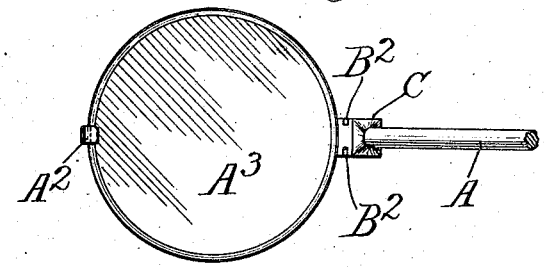
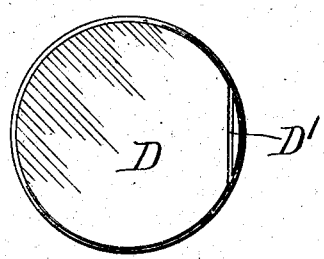
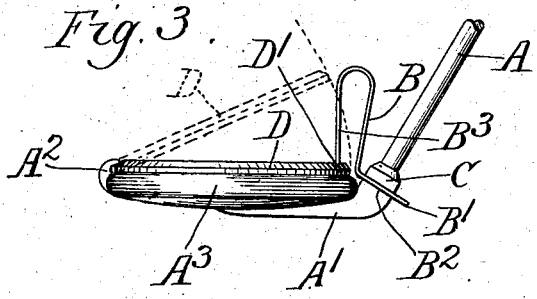
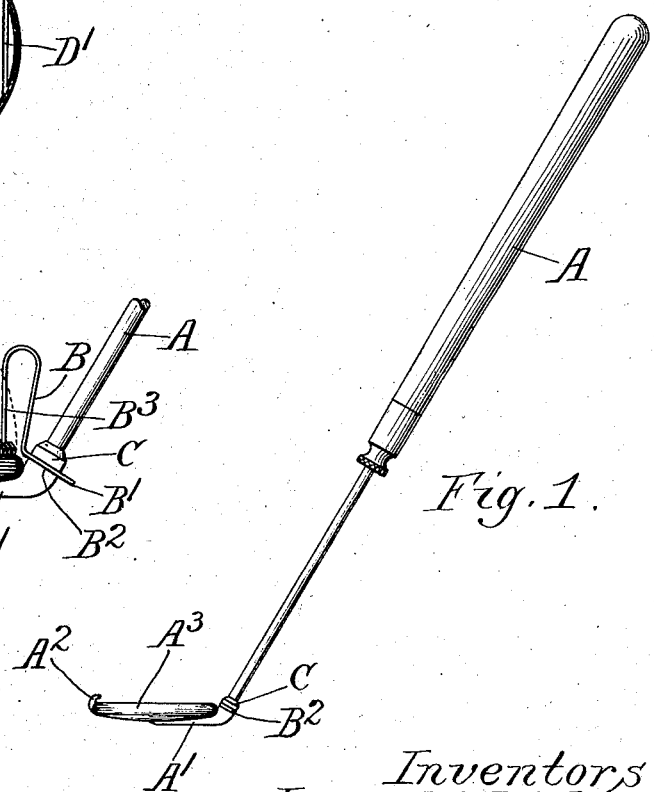
Witnesses
Edward T. Wray
Abbie E. Johnson
Inventors
James A. Wright
Anna M. Nicodemus
by Parker & Carter
Attorneys

UNITED STATES PATENT OFFICE.

JAMES A. WRIGHT AND ANNA M. NICODEMUS, OF CHICAGO, ILLINOIS.

DENTAL MIRROR.

No. 893,293.          Specification of Letters Patent.          Patented July 14, 1908.

Application filed October 7, 1907. Serial No. 396,222.

*To all whom it may concern:*

Be it known that we, JAMES A. WRIGHT and ANNA M. NICODEMUS, citizens of the United States, residing at Chicago, in the county of Cook and State of Illinois, have invented a certain new and useful Improvement in Dental Devices, of which the following is a specification.

Our invention relates to dental devices and particularly to mouth mirror protectors.

It is illustrated in the accompanying drawings, wherein

Figure 1 is a side elevation of a mouth mirror with our protector device attached; Fig. 2, a plan view of the same; Fig. 3, a side elevation showing the protector in position; Fig. 4, a detail plan view of the protector plate; and Fig. 5, a detail of the spring clip.

Like parts are indicated by the same letters in all the figures.

A is the handle of the mirror having at its lower end the arm $A^1$ with an upwardly turned clip or overhanging lug $A^2$ and the mirror body $A^3$. B is a spring clip having the bifurcated end pieces $B^1$ $B^1$ adapted to pass into the groove $B^2$ on the lower part of the handle A. The clip also has the forward spring portion $B^3$ which overlies the mirror and mirror protector. The lower part of the handle A is preferably formed of a square block or portion C so that the groove $B^2$ may be made therein properly and may be adapted to receive the end of the clip B. The protector plate D is preferably of glass and provided with the groove $D^1$ to receive the lower end of the spring $B^3$ of the clip.

We have shown our invention in a sense diagrammatic, illustrating a single form of structure in which our invention is utilized.

The use, operation and advantage of our invention is as follows: In ordinary mouth mirrors as used in dental surgery there is a constant danger of the mirror being injured, scarred and disfigured by contact with the bur or grinding or cutting tool which the dental surgeon is employing. As soon as the mirror is thus disfigured, even though slightly, it is to a considerable degree rendered unfit for use because it is difficult for the operator to determine whether or not the defect which his eye sees is in the mirror itself or in the work on which he is engaged. A considerable expense for the replacement of injured mirrors is thus entailed. With our device a removable protector plate is provided. It is adapted to be slipped into position as illustrated in Fig. 3. The forward edge of the protector plate passes under the clip $A^2$ and the inner edge slides down past the spring part $B^3$ until it gets into the position shown in full lines in Fig. 3. Here the clip portion $B^3$ slides forward and drops into the groove $D^1$. Thus the protector is easily put in position and securely held. When it is injured and another is to be substituted it is easily slipped sidewise, the clip portion $B^3$ sliding in the groove $D^1$ whereupon another protector can be put in place. The cost of the protectors is a negligible quantity.

We claim:—

1. The combination of a dental mouth mirror with a transparent plate, means for detachably securing it upon the mirror, comprising an overhanging lug at one edge and a movable clip at the opposite edge.

2. The combination of a dental mouth mirror with a transparent plate and means for detachably securing it upon the mirror comprising an overhanging lug at one edge and a spring clip at the other.

3. The combination of a mouth mirror containing a mirror plate with an overhanging lug at its outer edge and a clip at its inner edge, one edge of which overhangs the mirror, and the other end of which clasps the mirror handle.

4. The combination of a mouth mirror containing a mirror plate with an overhanging lug on its outer edge and a removable spring clip on its inner edge comprising a free end spring portion which overhangs the inner edge of the mirror, and a handle inclosing part at the other end.

5. The combination of a mouth mirror with a transparent plate and means for detachably securing the plate upon the mirror comprising a frictional contact piece which overhangs the disk and permits it to slide laterally and an overhanging lug at the opposite side of the transparent plate from the contact piece.

6. The combination of a mouth mirror with a transparent plate and means for detachably securing the plate upon the mirror comprising a frictional contact piece which overhangs the disk and permits it to slide laterally, and an overhanging lug at the opposite side of the transparent plate from the contact piece said disk provided with a groove to receive such overhanging part.

7. The combination of a mouth mirror with a transparent plate, an overhanging lug on the outer edge of the mirror to receive the outer edge of the plate, an overhanging spring clip on the inner edge of the mouth mirror, and a groove in the plate to receive the overhanging spring clip and permit the plate to move laterally on the mirror.

JAMES A. WRIGHT.
ANNA M. NICODEMUS.

Witnesses:
ABBIE E. JOHNSON,
SOPHIE B. WERNER,